United States Patent [19]

Hoch

[11] Patent Number: 4,815,778

[45] Date of Patent: Mar. 28, 1989

[54] CULTIVATOR

[76] Inventor: Alfred H. Hoch, 316 Windsor Cir., Cherry Hill, N.J. 08034-0035

[21] Appl. No.: 737,287

[22] Filed: May 23, 1985

[51] Int. Cl.$^4$ .................................................. B66F 3/00
[52] U.S. Cl. ................................. 294/55.5; 254/131.5; 254/132
[58] Field of Search ................. 294/55.5, 59, 60, 49, 294/50.6, 52, 61, 122, 125, 126; 254/131.5, 132, 131, 130, 129, 30; 56/400.21; 172/378, 379, 380

[56] References Cited

U.S. PATENT DOCUMENTS 1,494,557  5/1924  Lamry et al. ..................... 254/131.5
3,976,282  8/1976  Baker ................................... 254/132

*Primary Examiner*—James B. Marbert
*Attorney, Agent, or Firm*—Norman E. Lehrer

[57] ABSTRACT

A cylindrically shaped fulcrum member is affixed to the lower end of a garden tool such as a pitchfork, cultivator or weeder. The fulcrum member may be attached either directly to the tines or to the handle shaft if there are no tines and is located above the lowermost point of the tool. After the point of the tool is forced into the ground, the handle is moved rearwardly, the back of the fulcrum member contacts the ground and the lower end of the tool pivots upwardly braking up the soil or pulling up weeds or the like. The fulcrum member is provided with at least one bolt and nut clamping mechanism so that the member can be moved through and secured to different positions along the tines or the shaft to change the mechanical advantage of the tool.

1 Claim, 1 Drawing Sheet

CULTIVATOR

BACKGROUND OF THE INVENTION

The present invention is directed toward a cultivating or weeding tool and more particularly toward such a tool which has a movable fulcrum member for adjusting the mechanical advantage of the tool.

Hand-operated cultivating tools and weeders have been known and used for many years by both farmers and home gardeners alike. These tools are comprised essentially of an elongated shaft or handle having a grip at one end thereof. Attached to the other end of the elongated shaft are a plurality of fork-like tines or similarly shaped elements. The tool is utilized by forcing the tines downwardly into the ground and then pushing the handle backwardly. The upper part of the tines or lower portion of the handle acts as a fulcrum or pivot point about which the tool rotates. As the handle is pushed downwardly, the tines move upwardly breaking up the ground and lifting weeds or the like therewith.

It has been proposed in the past to increase the pivoting effect of cultivating and similar tools by adding a fulcrum member behind the upper part of the tines. One such proposal is shown, for example, in U.S. Pat. No. 1,494,557 which shows a tubularly shaped fulcrum member welded to a fixed point behind the tines. U.S. Pat. No. 567,391 shows a similar device but which is in the shape of a cylinder mounted for rotation.

While these prior art devices may have had limited advantages, they are not applicable to all types of cultivating and weeding tools and are relatively difficult to construct since they require a welding process. Furthermore, the pivot point is fixed and cannot be adjusted if desired.

U.S. Pat. No. 1,142,783 shows an arrangement which is substantially simpler to construct than the arrangements of the patents discussed above. This device includes a metal plate having two holes therein through which the tines of the tool can pass. An elongated piece of sheet metal extends from the plate and is bent into a U, the free end of which contacts the rear surface of the handle. While this device is relatively simple and inexpensive, it suffers from the same drawbacks of the first two patents mentioned above in that the pivot point or fulcrum cannot be adjusted.

SUMMARY OF THE INVENTION

The purpose of the present invention is to overcome the deficiencies of the prior art discussed above and to provide a cultivating tool or weeding device or the like wherein the pivot point can be manually adjusted. In accordance with the invention, a cylindrically shaped fulcrum member is affixed to the lower end of a garden tool such as a pitchfork, cultivator or weeder. The fulcrum member may be attached either directly to the tines or to the handle shaft if there are no tines and is located above the lowermost point of the tool. After the point of the tool is forced into the ground, the handle is moved rearwardly, the back of the fulcrum member contacts the ground and the lower end of the tool pivots upwardly braking up the soil or pulling up weeds or the like. The fulcrum member is provided with at least one bolt and nut clamping mechanism so that the member can be moved through and secured to different positions along the tines or the shaft to change the mechanical advantage of the tool.

BRIEF DESCRIPTION OF THE DRAWINGS

For the purpose of illustrating the invention, there are shown in the accompanying drawings forms which are presently preferred; it being understood that the invention is not intended to be limited to the precise arrangements and instrumentalities shown.

DETAILED DESCRIPTION OF THE PREFERRED EMBODIMENTS

Figure 1:
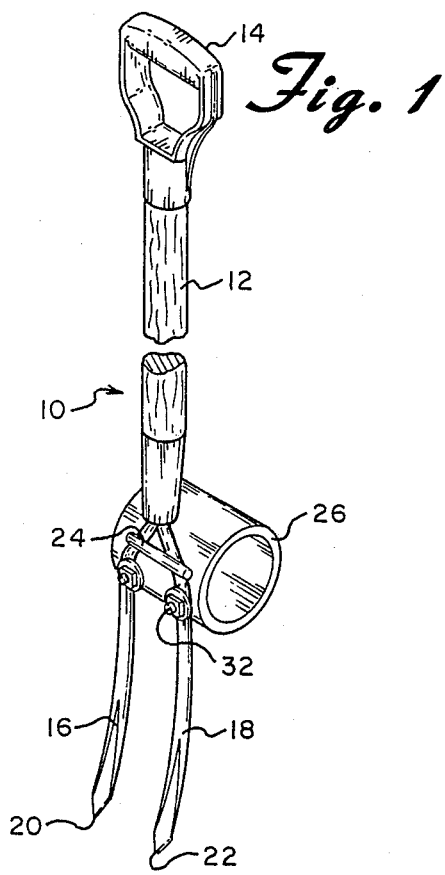
FIG. 1 is a cultivating tool constructed in accordance with the principles of the present invention.

Referring now to the drawings in detail wherein like reference numerals have been used throughout the various figures to designate like elements, there is shown in FIG. 1 a perspective view of a cultivating tool constructed in accordance with the principles of the present invention and designated generally as 10. The cultivating tool 10 is comprised of an elongated handle 12 having a grip 14 at the upper end thereof. A plurality of tines 16 and 18 extend downwardly from the lower end of the elongated handle 12. The tines terminate in relatively sharp points 20 and 22 which allow the tines to pierce the ground relatively easily. A rigid bar 24 located at the upper portions of the tines is welded or otherwise secured thereto in order to reinforce the same.

Figure 3:
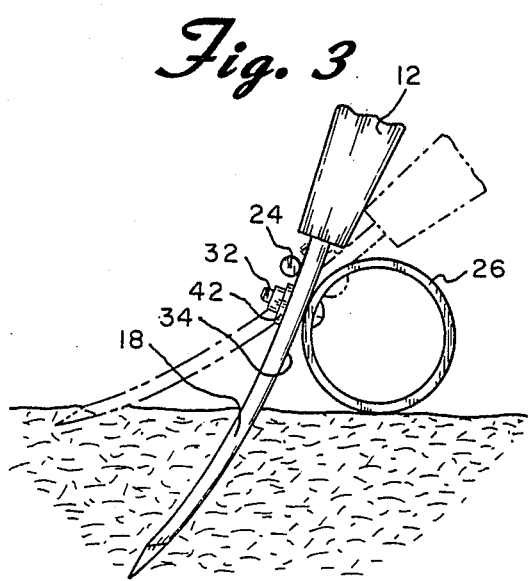
FIG. 3 illustrates the manner in which the tool of the present invention is used.

The tool just described is a conventional device which does not, per se, form a part of the present invention. The invention is intended to be an improvement thereon. While only two tines 16 and 18 are shown in the cultivating tool 10 in FIG. 1, it should be noted that substantially any number of tines may be present. The invention is equally applicable to a tool having three, four or more tines. Even further, the specific shape of the tines is not critical to the operation of the invention. The tines may be of either circular or rectangular cross section. In the embodiment shown in FIG. 1, the tines are of essentially circular cross section but include flattened lower portions. As should be readily apparent to those skilled in the art, the flattened lower portions provide an increased surface area which is used to raise the dirt or ground when the device is used such as shown in FIG. 3.

The cultivating tool 10 is also provided with a substantially tubularly shaped fulcrum member 26. Fulcrum member 26 is preferably comprised of a rigid plastic pipe having a diameter of approximately four or five inches. However, the diameter may vary and, in fact, more than one section of pipe may be supplied so that the pipe may be changed when desired in order to change the mechanical advantage of the tool.

In use, a gardener or other person utilizing the tool may use the upper surface of the fulcrum member 26 as a support. For example, when inserting the tool into the ground, he may put his foot and all of his weight on the upper surface of the member 26 in order to force the tines 16 and 18 into the ground. For this reason, the tubular member 26 should be constructed of strong enough plastic material to handle this weight and force.

Figure 2:
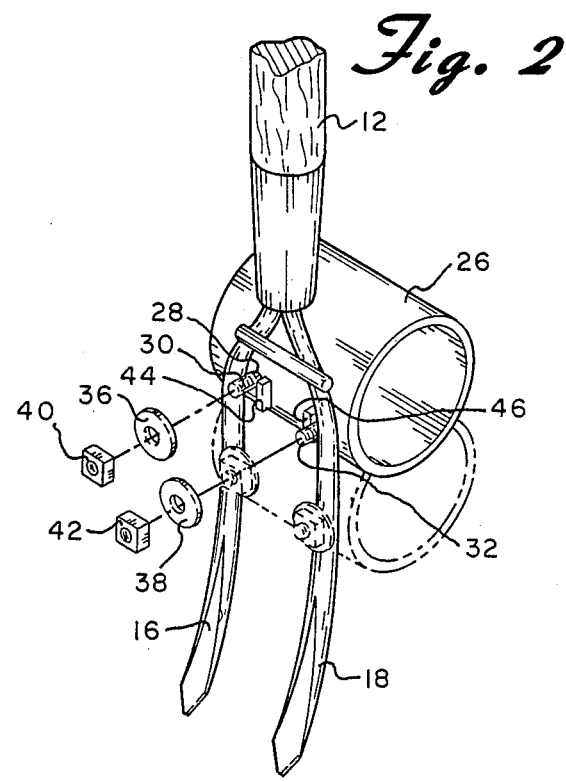
FIG. 2 is an exploded view of the lower portion of FIG. 1 showing the details of the fulcrum member.

The wall of the fulcrum member 26 is provided with a plurality of spaced holes passing therethrough, only one such hole 28 being visible in FIG. 2. Bolts 30 and 32 pass through these openings from the interior of the tubularly shaped member 26 and extend outwardly above the outer surface of the member 26.

The fulcrum member 26 is located transversely of the tines 16 and 18, i.e. perpendicular to the axes of the tines or the handle 12, and behind or beneath the tines so that the outer surface of the fulcrum member 26 contacts the undersurface 34 of the tines. The fulcrum member 26 is held in place by washers 36 and 38 which are placed over the bolts 30 and 32 and which are forced downwardly against the front surface of the tines 16 and 18 by nuts 40 and 42. It should be noted that the holes such as hole 28 in the wall of the fulcrum member 26 are arranged so that the bolts 30 and 32 will be directly adjacent one of the tines and preferably at the inner surface thereof so that the washers will be forced against the tines. The bolts 30 and 32 must, of course, be long enough so that the forward ends thereof terminate above the front surface of the tines. Essentially, the securing means comprised of the bolts 30 and 32, the washers 36 and 38 and the nuts 40 and 42 clamp the tines between the ends of the bolts and the outer surface of the fulcrum member 26.

As stated above, the fulcrum member 26 may function also as a support surface for supporting the weight of the gardener who may use the same to force the tool down into the ground. Because of this, the fulcrum member 26 must be very tightly secured to the tines 16 and 18. Otherwise, it may move when downward forces are applied thereto. However, if nuts 40 and 42 are secured too tightly to their respective bolts, damage can be caused to the wall of the fulcrum member 26. To prevent this, a pair of stop members 44 and 46 are mounted on the outer surface of the fulcrum member 26 adjacent each of the openings. The height of the stop members 44 and 46 above the outer surface is slightly less than the diameter of the tines 16 and 18. In use, the nuts 40 and 42 will be tightened and as this is done the wall of the fulcrum member 26 and the washers 36 and 38 may flex slightly but eventually will be limited by the washers contacting the outer surfaces of the stop members 44 and 46. At this point, sufficient force will have been applied to maintain the fulcrum member 26 securely in place while avoiding any damage thereto by overtightening the nuts 40 and 42.

Whenever it is desired to move the pivot point, all that is necessary is to loosen the nuts 40 and 42 and slide the fulcrum member 26 downwardly or upwardly along a portion of the length of the tines 16 and 18 to the new position At that point, the nuts 40 and 42 are then again tightened to secure the fulcrum member 26 in its new position. In addition to changing the pivot point, moving the position of the fulcrum member 26 can also be used to limit the depth or penetration of the tines. For example, if it is desired to have the tines penetrate the ground to the depth of only two inches, the fulcrum member 26 can be set at a position which is exactly two inches above the points 20 and 22 of the tines.

Figure 4:
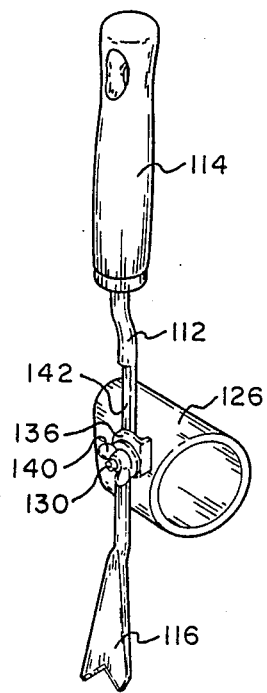
FIG. 4 is a perspective view similar to FIG. 1 of a second embodiment of the invention.

A second embodiment of the invention is shown in FIG. 4. The device shown therein is a hand tool which is generally used to remove individual weeds. The tool includes an elongated shaft 112 having a handle 114 attached to the upper end thereof. Secured to the lower end of the shaft 112 is a V-shaped working element 116. Again, the tool just described is a well known and widely used weeding tool.

A substantially tubularly shaped fulcrum member 126 is located transversely beneath the shaft 112. A bolt 130 passes through an opening in the wall of the fulcrum member 126 and through an opening in a clamping member 136. A wing nut 140 is screwed onto the end of the bolt 130.

When it is desired to move the fulcrum member 126 along the length of the shaft 112, the wing nut 140 is loosened thereby loosening the clamping member 136 from the shaft 112. After the fulcrum member 126 is moved to its new desired position, the wing nut 140 is again tightened on the bolt 130 until the clamping member 136 again securely grips the shaft 112.

Unlike the embodiment shown in FIGS. 1 and 2 wherein there are two tines 16 and 18, the embodiment shown in FIG. 4 includes only a single elongated shaft 112 to which the fulcrum member 126 is secured. In view of this, the fulcrum member 126 may tend to rotate about the axis of the shaft 112. In order to prevent this, the shaft which is generally circular in cross section is provided with a flattened surface 142 along at least a portion of the length thereof. This flattened surface 142 in combination with the flat undersurface of the clamping member 136 prevents rotation of the fulcrum member 126 when the wing nut 140 is tightened.

The present invention may be embodied in other specific forms without departing from the spirit or essential attributes thereof and accordingly, reference should be made to the appended claims rather than to the foregoing specification as indicating the scope of the invention.

I claim:

1. In a cultivating tool having an elongated handle with a grip at one end thereof and a plurality of tines extending from the other end of said elongated handle, the improvement comprising a substantially tubularly shaped fulcrum member located transversely beneath said tines and contacting the undersurface of said tines and means securing said member thereto, said securing means being manually operable so that said member can be released when desired and moved along at least a portion of the length of the tines to a new position where it can again be secured, said manually operable securing means being comprised of a plurality of bolts passing from the interior of said tubularly shaped fulcrum member through spaced apart openings in the wall of said member with each bolt terminating above the front surface of a different one of said tines, a stop member mounted on the outer surface of said tubular member adjacent each of said openings, the height of said stop members above said outer surface being less than the diameter of said tines, said securing means clamping said tines between the ends of said bolts and the outer surface of said tubular member.

* * * * *